United States Patent [19]

Brunet

[11] 4,028,635

[45] June 7, 1977

[54] VIBRATION ENERGY TRANSFER LASER

[75] Inventor: Henry Brunet, L'Hay les Roses, France

[73] Assignee: Compagnie Generale d'Electricite, Paris Cedex, France

[22] Filed: Dec. 24, 1975

[21] Appl. No.: 644,008

[30] Foreign Application Priority Data

Jan. 15, 1975  France .............................. 75.01176

[52] U.S. Cl. ..................... 331/94.5 G; 331/94.5 P; 330/4.3
[51] Int. Cl.² ..................... H01S 3/22; H01S 3/097
[58] Field of Search .................... 331/94.5; 330/4.3

[56] References Cited

UNITED STATES PATENTS 3,810,042  5/1974  Chang et al. ................. 331/94.5 G Primary Examiner—Robert J. Webster
Attorney, Agent, or Firm—Sughrue, Rothwell, Mion, Zinn & Macpeak

[57] ABSTRACT

The invention concerns a vibration energy transfer laser. Vibration energy which is transferred by molecular interaction to bromhydric acid which can then produce infra-red light by stimulated emission, is imparted to nitrogen. Application to the transmission of light through the atmosphere.

4 Claims, 1 Drawing Figure

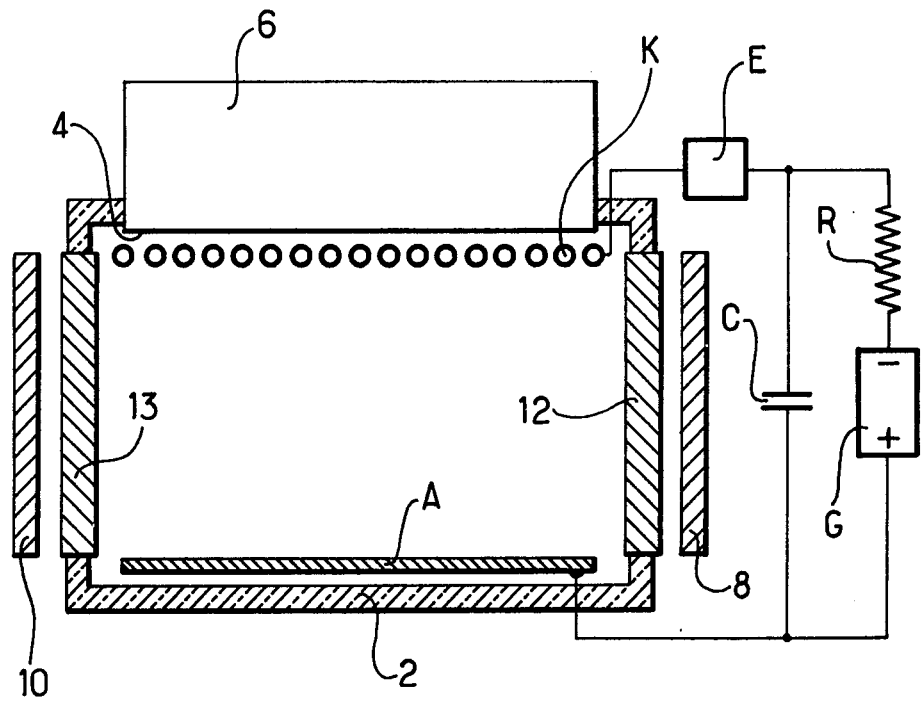

VIBRATION ENERGY TRANSFER LASER

The invention concerns a vibration energy transfer laser.

Vibration energy transfer lasers in which a first gas is excited, for example by an electric discharge, so as to supply to its molecules a vibration energy, that first excited gas being mixed with a second gas so as to transfer the vibration energy of the molecules from the first to those of that second gas and that gas at least is included in an optical system, for example an optical resonant cavity, to cause a stimulated light emission, by that second gas, are known. Evidently, the choice of the couple of the two gases used depends indissolubly on the energy transitions which can be used in the spectra of the two gases, to fulfill the following functions: excitation of the first gas, giving up of energy by the first gas at the time of the molecular interaction, receiving of energy by the second gas at the time of molecular interaction, emitting of light by the second gas. It is known that the first gas can be, for example, nitrogen and that the second gas can be carbon monoxide CO, carbon dioxide $CO_2$ or nitrous oxide $N_2O$. The excitation of the first gas can result not from an electric discharge, but from a chemical reaction by which that first gas if formed a very short time before the transfer of vibration energy to the second gas. It is then known that this first gas can be deuterium hydride DF or bromhydric acid HDr, the second gas being carbon dioxide $CO_2$. The use of hydrogen $H_2$ or of deuterium $D_2$ as a first gas and of hydrofluoric acid HF or hydrochloric acid HCl as the second gas has also been prescribed (articles by S. R. BYRON, L. Y. NELSON AND G. J. MULLANEY, in Applied Physics Letters 10,565,1973).

The aim of the present invention is to produce a vibration energy transfer laser supplying a light capable of propagating over a long distance through the atmosphere.

It has as its object a vibration energy transfer laser comprising means for exciting a first gas by supplying to its molecules a vibration energy, to mix that first excited gas with a second gas so as to transfer the vibration energy from the molecules of that first gas to the molecules of that second gas and to include at least that second gas in an optical system enabling a stimulated emission of light by that second gas, characterized in that the second gas is bromhydric acid HBr, the said first gas being nitrogen.

With reference to the single diagrammatic FIGURE herewith, a description having no limiting character of an embodiment of the invention will be given herebelow.

The single FIGURE is a cross-section view of a laser according to the invention.

The laser according to the invention emits at the vibration-rotation transitions of the bromhydric acid and the wavelength of the light emitted is comprised between 4 and 4.6 microns, this causing its transmission through the atmosphere to be excellent.

It comprises a parallelepipedical insulating enclosure 2 which is one meter in length and has a square cross-section of 10 cm by 10 cm, containing a mixture of nitrogen at a pressure comprised between 200 and 1000 torrs approximately, for example 500 torrs, with bromhydric acid at a pressure comprised between 1% and 10% of that of nitrogen, approximately, for example 20 torrs, at a temperature comprised between 200° and 300° K. A lateral wall 4 of the enclosure 2 is transparent for electrons produced by an electron gun 6, of the cold cathode type, with an energy comprised between 100 and 200 keV, for example 140 keV and a current density comprised between 0.5 and 5 A/squ.cm, for example 2.5 A/squ.cm, during a time comprised between 0.5 and 5 microseconds, for example 2 microseconds.

Towards the end of the irradiation of the enclosure 2 by the electron gun 6, an electric discharge is set up across the enclosure 2 between a cathode K in the form of a grid arranged in the enclosure 2 in the vicinity of the wall 4, over the whole surface of the latter and an anode A in the form of a plate arranged similarly in relation to the opposite wall to the wall 4.

That discharge, having an energy comprised preferably between 100 and 500 Joules per litre of the volume of the enclosure, is set off by a spark arrester E by means of a capacitor C having a capacity of 0.5 microfarads, for example, itself previously charged at 80 kV for example by a generator G across a resistor R.

The end walls of the enclosure 2 are taken up by two ports 12 and 13 which are transparent to infra-red radiation and cannot be corroded by bromhydric acid and constituted, for example, by fluorine $CaF_2$.

A mirror 8 having a coefficient of reflection close to unity and a mirror having a fairly weak coefficient of transmission, for example 20%, are arranged outside the enclosure 2 and adjacent to the ports 12 and 13. The mirrors 8 and 10 constitute an optical resonant cavity enabling a laser oscillation to appear. It is nevertheless quite evident that the present invention applies to a laser amplifier as well as to a generator.

The generator which has just been described makes it possible to obtain pulses having an energy of several tens of Joules per litre of the useful volume of the enclosure 2.

It can be an advantage, with a view to modelling the characteristics of the electric discharge, to add, to the mixture of nitrogen and bromhydric acid, a rare gas such as argon at a pressure which can be less than or approximately equal to that of the nitrogen.

I claim:

1. In an apparatus for the stimulated emission of coherent radiation and comprising: a first gaseous molecular medium; means for exciting said first medium by supplying vibrational energy to its molecules; a second active gaseous molecular medium; means for mixing said first and second mediums whereby vibrational energy is transferred from said first to said second medium to create a population inversion in said second medium; and means for stimulating the emission of coherent radiation from said second medium; the improvement wherein said second active medium is hydrogen bromide, and said first medium is nitrogen.

2. The improvement according to claim 1, in which said means for exciting said first medium and for mixing it with said second medium comprise: an excitation enclosure; means for supplying said enclosure with a gaseous mixture of nitrogen and hydrogen bromide; an electron gun for providing pulses of electrons whose energy is between 100 and 200 keV; and means for causing in said enclosure, approximately at the end of each phase, an electric discharge whose energy is between 100 and 500 Joules per litre of the volume of said enclosure.

3. The improvement according to claim 2, characterized in that the nitrogen pressure in the gaseous mixture is between 200 and 1000 torrs, the hydrogen bromide pressure is between 1% and 10% of that of the nitrogen, the current density supplied by said electron gun is between 0.5 and 5 A/squ.cm during a time period between 0.5 and 5 microseconds, and the temperature of the mixture is between 200° and 300° K.

4. Laser according to claim 3, characterized in that the said gaseous mixture comprises, moreover, argon.

* * * * *

UNITED STATES PATENT AND TRADEMARK OFFICE
CERTIFICATE OF CORRECTION

PATENT NO. : 4,028,635

DATED : June 7, 1977

INVENTOR(S) : Henry BRUNET

It is certified that error appears in the above—identified patent and that said Letters Patent are hereby corrected as shown below:

Column 2, line 26, delete "fluorine" and substitute therefor--calcium fluoride--

Signed and Sealed this

Fourth Day of October 1977

[SEAL]

Attest:

RUTH C. MASON
*Attesting Officer*

LUTRELLE F. PARKER
*Acting Commissioner of Patents and Trademarks*